United States Patent [19]

Roe et al.

[11] Patent Number: 4,751,259

[45] Date of Patent: Jun. 14, 1988

[54] COMPOSITIONS FOR IRON ORE AGGLOMERATION

[75] Inventors: William J. Roe, Aurora; Jacqueline L. Bonin; Radeakrishnan Selvarajan, both of Oak Park, all of Ill.

[73] Assignee: Nalco Chemical Company, Naperville, Ill.

[21] Appl. No.: 81,763

[22] Filed: Aug. 5, 1987

[51] Int. Cl.$^4$ .............................................. C08J 0/00
[52] U.S. Cl. ...................... 524/52; 524/47; 524/405
[58] Field of Search ....................... 524/47, 52, 53, 405

[56] References Cited

U.S. PATENT DOCUMENTS

| | | | |
|---|---|---|---|
| Re. 28,474 | 7/1974 | Anderson et al. | 524/606 |
| Re. 28,576 | 10/1975 | Anderson et al. | 524/606 |
| 2,914,496 | 11/1959 | Gordon et al. | 524/53 |
| 3,171,805 | 3/1965 | Suen et al. | 210/54 |
| 3,259,570 | 7/1966 | Priesing et al. | 210/53 |
| 3,284,393 | 11/1966 | Vanderhoff et al. | 524/801 |
| 3,418,237 | 12/1968 | Booth et al. | 210/54 |
| 3,487,032 | 12/1969 | Guziak et al. | 524/52 |
| 3,624,019 | 11/1971 | Anderson et al. | 524/606 |
| 3,692,673 | 9/1972 | Hoke | 210/52 |
| 3,734,336 | 5/1973 | Anderson et al. | 523/336 |
| 3,767,629 | 10/1973 | Vallino, Jr. et al. | 526/84 |
| 3,808,161 | 4/1974 | Lipscomb, Jr. et al. | 524/53 |
| 3,826,771 | 7/1974 | Anderson et al. | 524/606 |
| 3,900,611 | 8/1975 | Corbett et al. | 524/405 |
| 3,997,492 | 12/1976 | Kane et al. | 524/606 |
| 4,024,097 | 5/1977 | Slowsky et al. | 524/723 |
| 4,055,594 | 10/1977 | Hadgraft et al. | 524/52 |
| 4,172,054 | 10/1979 | Ogawa et al. | 524/52 |
| 4,448,914 | 5/1984 | Drinkuth et al. | 524/52 |
| 4,524,175 | 6/1985 | Stanley, Jr. | 524/831 |
| 4,544,689 | 10/1985 | Ehmann et al. | 524/52 |
| 4,615,739 | 10/1986 | Clark et al. | 524/53 |

FOREIGN PATENT DOCUMENTS

| | | | |
|---|---|---|---|
| 0010227 | 1/1974 | Japan | 524/52 |
| 0105536 | 9/1978 | Japan | 524/52 |
| 0158383 | 12/1980 | Japan | 524/52 |
| 0139158 | 8/1982 | Japan | 524/52 |
| 0216730 | 12/1983 | Japan | 524/52 |
| 0006772 | 1/1985 | Japan | 524/53 |

Primary Examiner—Joseph L. Schofer
Assistant Examiner—J. M. Reddick
Attorney, Agent, or Firm—John G. Premo; Donald G. Epple; Anthony L. Cupoli

[57] ABSTRACT

The invention consists of compositions for agglomerating wetted metal-containing ores. Such such compositions are:

| Ingredients | General % by Weight |
|---|---|
| A. A water-in-oil emulsion of a water-soluble vinyl addition polymer which contains at least 10% by weight of the water-soluble vinyl addition polymer | 10–45 |
| B. A polysaccharide | 55–90 |
| C. A water-soluble surfactant | 0.001–10 |
| D. Borax | 0–15 |

Also described is the use of these compositions for agglomerating wetted metal ore-containing materials are the products produced by such an agglomeration process.

6 Claims, No Drawings

4,751,259

COMPOSITIONS FOR IRON ORE AGGLOMERATION

THE INTRODUCTION

Bentonite clay is the most commonly used binder of taconite (iron ore) pellets in the pelletizing process. It is commonly employed at levels as high as 1.0–1.5% by weight in the fine iron solids reporting to the balling disks. As such, substantial amounts of impurities (as $SiO_2$ and $Al_2O_3$) are introduced which compromise the quality of the fired pellets. Today's reduction plants throughout the world have become more sophisticated, and desire to process pellets of higher purity. This is particularly true of direct reduction plants. This fact, combined with the declining availability of high-quality sodium bentonites, is the major driving force to employ organic binders as bentonite replacements.

The subject invention comprises novel compositions for agglomerating metal-containing ores which can provide comparable performance characteristics relative to bentonite at a fraction of the applied dosage. Because the compositions contain no siliceous materials, pellets produced with the binder compositions are measurably lower in inorganic impurity levels.

THE INVENTION

The invention consists of compositions for agglomerating wetted metal-containing ores. Such compositions are:

| Ingredients | General % by Weight |
| --- | --- |
| A. A water-in-oil emulsion of a water-soluble vinyl addition polymer which contains at least 10% by weight of the water-soluble vinyl addition polymer | 10–45 |
| B. A polysaccharide | 55–90 |
| C. A water-soluble surfactant | 0.001–10 |
| D. Borax (sodium tetraborate) | 0–15 |

These compositions, when added to fine ores at levels of 0.5–10 pounds per ton, provide excellent ore pellet strengths, good ball formation in drum or disk agglomerators, and introduce no objectionable impurities.

THE METAL-CONTAINING ORES

The material to be pelletized in accordance with this invention may be almost any type of metallic mineral or ore. For example, the predominant metal constituent may be lead, copper, nickel, zinc, uranium, iron, and the like. Particularly effective results are realized in the pelletization of minerals predominantly containing iron. The material to be pelletized may contain iron ore deposits coming directly from the mining site, from ore "tailings", flue dust, cold and hot fines from a sinter process, or iron ore which is found in a sludge condition as aqueous iron ore concentrates from natural sources or recovered from various processes. Any one of these sources of iron or any possible combination thereof may be employed according to their availability and particular process set-up of the pelletizing unit. Iron ore or any of a wide variety of the following minerals may form a part of the material to be pelletized: magnetite, hematite, limonite, goethite, siderite, franklinite, ilmenite, chromite, pyrite, and the like. The invention is particularly useful in pelletizing taconite.

PARTICLE SIZE OF THE METAL-CONTAINING ORES

The material to be agglomerated is desirably about 90% minus 100 mesh. Finely divided material having a size of about 90% minus 200 mesh is most appropriate for the practice of this invention, but material as small as about 90% minus 325 mesh can be employed.

THE POLYSACCHARIDES

The term, "polysaccharides" as used herein and in the claims includes starches, modified starches, cellulose and modified cellulose, sugars and gums. Saccharides included are disaccharides and trisaccharides which may be used in accordance with this invention. The preferred compounds are the tetra, penta- and higher polysaccharides and oligosaccharides, i.e., saccharides containing at least four linked monosaccharide molecules, and derivatives thereof containing substituents such as hereinbefore defined.

Some specific polysaccharides used to prepare the novel compositions of this invention include, but are not limited to, water-soluble derivatives of cellulose such as chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, carboxymethyl cellulose and the like cellulose ethers.

Other polysaccharides include starch and water-soluble derivatives of starch, e.g., chlorohydroxypropyl starch, phenylhydroxyethyl starch, hydroxybutyl starch, methyl starch, ethyl starch, hydroxyethyl starch, hydroxyethyl methyl starch, hydroxypropyl methyl starch, and carboxymethyl starch.

Still other polysaccharides which may be used include the so-called "sugars" such as sucrose, maltose, lactose, raffinose, stachyose and vertascose; causticized lignite; biochemically-synthesized heteropolysaccharides, e.g., produced by the action of bacteria of the genus Xanthomonas or the genus Arthrobacter on carbohydrates.

The preferred polysaccharides are corn starch, potato starch, dextrin, pre-gelatinized starch, ethoxylated pre-gelatinized starch, amphoteric pre-gelatinized starch and crude carboxymethyl cellulose, with the most preferred being gelatinized starches, particularly pre-gelatinized corn starch.

THE WATER-IN-OIL EMULSIONS

The water-in-oil emulsions of water-soluble vinyl addition polymers useful in this invention contain four basic components. These components and their weight percentages in the emulsions are listed below:

A. water soluble vinyl addition polymer:
 1. Generally from 10–60%;
 2. Preferably from 20–40%; and
 3. Most preferably from 25–35%;
B. Water:
 1. Generally from 20–90%;
 2. Preferably from 20–70%; and
 3. Most preferably from 30–55%;
C. Hydrophobic liquid:
 1. Generally from 5–75%;
 2. Preferably from 5–40%; and
 3. Most preferably from 20–30%; and
D. Water-in-oil emulsifying agent:
 1. Generally from 0.1–21%;
 2. Preferably from 1–15%;

3. Most preferably from 1.2–10%.

It is also possible to further characterize the water-in-oil emulsions of water soluble vinyl addition polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of ths invention will have a water/oil ratio of from 0.25 to 18. Preferably, the water-in-oil ratio will range from 0.5–14, and most preferably from 1.0–2.75.

Emulsions of the type described above may be dehydrated to produce compositions which contain between 0–5% by weight of water. Such dehydration may be accomplished by using as the hydrophobic liquid a low boiling hydrocarbon such as toluene and the like which form azeotropes with water. When such hydrophobic liquids are used, all or a portion of the water may be removed from the emulsions by using known azeotropic distillation techniques. These dehydrated emulsions are considered to be water-in-oil emulsions of the type described and claimed herein.

THE WATER-SOLUBLE VINYL ADDITION POLYMERS

For a generlized description of the water-soluble vinyl addition polymers, see U.S. Pat. No. RE 28,576 and the references cited therein. All of these disclosures are incorporated herein by reference.

These polymers are well known to the art and have been described in numerous publications and patents. Typical of such polymers are acrylamide polymers which include polyacrylamide and its water-soluble copolymeric derivatives such as, for instance, acrylamide-acrylic acid, and acrylamide-acrylic acid salt copolymers which contain from about 95–5% by weight of acrylamide. Also useful are copolymers of acrylamide with other vinyl monomers such as maleic anhydride (acid), acrylonitrile, styrene and the like.

Other water-soluble vinyl polymers are described in detail in the following U.S. Patents: Nos. 3,418,237, 3,259,570 and 3,171,805.

In examining the disclosures of these patents it will be seen that the water-soluble polymers may be either cationic or anionic and, in some instances, the ionic charges are sufficiently slight so that the polymers may be considered as nonionic.

While any of the polymers thus described may be used in the practice of the invention, a preferred group of polymers are the high molecular weight polymers of acrylamide which contain at least 50 mole percent of acrylamide and preferably between 90–99 mole percent of acrylamide. The other component of these acrylamide copolymers is anionic in nature and may be selected either from acrylic acid, methacrylic acid and the vinyl sulphonated acids of the type described in U.S. Pat. No. 3,692,673, the disclosure of which is incorporated herein by reference. A preferred monomer is AMPS, 2-acrylamido-2-methyl propanesulfonic acid[1].

[1] Trademark of Lubrizol Corporation

When the acrylamide or acrylamide copolymers comprise the active portion of the emulsions, they should have a weight average molecular weight of at least 1,000,000 with a preferred molecular weight being 5,000,000 or more.

When cationic polymers are used as homopolymers, they will have weight average molecular weight of at least 150,000 and preferably 200,000 or greater. Preferred cationic monomers used to prepare the cationic homo- or copolymers are DADMAC, (diallyldimethyl ammonium chloride), and MAPTAC (methacrylamidopropyl trimethyl ammonium chloride). Typical polymers of the type described above useful in the practice of the invention are set forth below:

| Polymer | | | RSV (measured at 0.045% polymer in 1N NaNO$_3$) | Approximate Molecular Weight |
|---|---|---|---|---|
| A | 93% | acrylamide/07% NaAcrylate; | RSV 20–26 | 7–15 × 10$^6$ |
| B | 65% | acrylamide/35% NaAcrylate; | RSV 30–36 | 10–15 × 10$^6$ |
| C | 70% | acrylamide/30% 2-AMPS; | RSV 20–25 | 7–15 × 10$^6$ |
| D | 100% | ammonium polyacrylate; | RSV 28–36 | 7–15 × 10$^6$ |
| E | 100% | polyacrylamide; | RSV 19–25 | 7–15 × 10$^6$ |
| F | 87% | DADMAC/13% acrylamide; | RSV 2–4 | 2–8 × 10$^5$ |
| G | 5% | MAP TAC/95% acrylamide; | RSV >16 | ≧6– × 10$^6$ |

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branched-chain isoparaffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent". Typical specifications of this material are set forth below in Table I.

TABLE I

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |

TABLE I-continued

| | |
|---|---|
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF WATER-SOLUBLE ACRYLIC ACID POLYMERS

The general method for the preparation of emulsions of the type described above is contained in Vanderhoff, U.S. Pat. No. 3,284,393. A typical procedure for preparing water-in-oil emulsions of this type includes preparing an aqueous solution of a water-soluble vinyl addition monomer and adding this solution to one of the hydrocarbon oils described above. With the addition of a suitable water-in-oil emulsifying agent and under agitation, the emulsion is then subjected to free radical polymerization conditions and a water-in-oil emulsion of the water-soluble vinyl addition polymer is obtained. It should be pointed out that the ingredients are chosen based upon the weight percentages given above and their compatability with each other. As to choice of free radical initiator, these materials may be either oil or water-soluble and may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, RE 28,474, 3,734,873, RE 28,576, 3,826,771, all of which are incorporated by reference. The use of air may be employed to control polymerization. This technique is described in U.S. Pat. No. 3,767,629 which is also hereinafter incorporated by reference.

THE COMPOSITION OF THE INVENTION

Typical compositions of the invention are set forth below:

| Ingredients | General % by Weight | Preferred % by Weight |
|---|---|---|
| A. A water-in-oil emulsion of of a water-soluble vinyl addition polymer which contains at least 10% by weight of the water-soluble vinyl addition polymer | 10–45 | 20–45 |
| B. A polysaccharide | 55–90 | 60–85 |
| C. A water-soluble surfactant | 0.001–10 | 0.01–5 |
| D. Borax | 0–15 | 5–10 |

It has been discovered that various acrylamide-containing latices impart green (wet) strength to the taconite pellets, but relatively poor dry strength. Conversely, the various stretches, dextrins, and derivatized starches and cellulosics may provide excellent pellet dry strengths, but poor green strengths. This invention combines the action of both, and relies on the surprising discovery that as much as 40–45% by weight of latex emulsion polymer can be combined with a starch powder and still yield a dry product. Incorporation of borax in the polymer/surfactant mixture has the effect on many ores of improving ballability (more pellets in the corect size range) as well as increasing pellet dry strength.

THE WATER-SOLUBLE SURFACTANTS

It is important to the invention that the composition contain a water-soluble surfactant. The surfactant used as a part of the composition may be conveniently combined into and forms a component of the water-in-oil emulsion of the water-soluble vinyl addition polymer. While this is the most convient and practical method, the compositions can contain the water-soluble surfactant as a coating on the polysaccaharide or it may be a separate ingredient. Another alternative is that the water-soluble surfactant may be admixed with the taconite prior to its being treated with the compositions previously described.

The preferred surfactants utilized to cause the inversion of the water-in-oil emulsion of this invention when the emulsion is added to water are hydrophilic and are further characterized as being water soluble. Any hydrophillic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide. A more complete list of surfactants used to invert the emulsion are found in Anderson, U.S. Pat. No. 3,624,019 at columns 4 and 5, the disclosure of which is incorporated hereby by reference.

It is critical to note that only latex/starch water-soluble surfactant combinations are efficacious; blends of dry acrylamide-based polymers with starch do not work. The instantaneous action with water occurs when a latex emulsion is added to water in the presence of a water-soluble surfactant. The dry forms of the polymers do not hydrate quickly enough to positively affect taconite ball formation and strength properties.

EVALUATION OF THE INVENTION

Typical compositions of the invention are set forth below:

Composition 1
  53.3% amphoteric pregelatinized starch
  13.3% sodium tetraborate
  32.9% acrylamide/2-AMPS latex copolymer (Polymer C)
  0.5% ethoxylated nonylphenol (9-10 moles EO)

Composition 2
  53.3% ethoxylated pregelatinized starch
  13.3% sodium tetraborate
  32.9% acrylamide/2-AMPS latex copolymer (Polymer C)
  0.5% ethoxylated nonylphenol (9-10 moles EO)

Composition 3
  53.3% amphoteric pregelatinized starch
  13.3% sodium tetraborate
  32.5% ammonium polyacrylate latex homopolymer (Polymer D)
  0.3% ethoxylated nonylphenol (9-10 moles EO)
  0.6% ammonium oleate Composition 4
  53.3% amphoteric pregelatinized starch
  13.3% sodium tetraborate
  32.9% acrylamide/MAPTAC latex copolymer (Polymer G)
  0.3% ethoxylated nonylphenol (9-10 moles EO)
  0.2% ethoxylated nonylphenol (6 moles EO)

Composition 5
  53.3% amphoteric pregelatinized starch
  13.3% sodium tetraborate
  32.9% acrylamide/DADMAC latex copolymer (Polymer F)
  0.5% ethoxylated nonylphenol (9-10 moles EO)

Composition 6
  53.5% amphoteric pregelatinized starch
  13.3% sodium tetraborate
  33.4% acrylamide/sodium acrylate branched latex copolymer (Polymer B)
  0.5% ethoxylated octylphenol (8 moles EO)

Composition 7
  60% crude carboxymethylcellulose
  15% sodium tetraborate
  24.6% acrylamide/2-AMPS latex copolymer (Polymer C)
  0.4% ethoxylated nonylphenol (9-10 moles EO)

Composition 8
  57.5% corn starch
  34.5% acrylamide/sodium acrylate latex copolymer (Polymer A)
  0.5% ethoxylated nonylphenol (9-10 moles EO)
  7.5% sodium tetraborate Composition 9
  55% pre-gelatinized corn starch
  34.5% acrylamide/sodium acrylate latex copolymer (Polymer A)
  10.0% sodium tetraborate
  0.5% ethyoylated monylphenol (9-10 moles EO)

Composition 10
  55% pre-gelatinized corn starch
  34.5% acrylamide/sodium AMPS latex copolymer (Polymer C)
  10.0% sodium tetraborate
  0.5% ethoxylated nonylphenol (9-10 moles EO)

Composition 11
  90% pre-gelatinized corn starch
  10% sodium tetraborate

Composition 12
  65% pre-gelatinized corn starch
  34.5% acrylamide/sodium acrylate latex copolymer (Polymer A)
  0.5% ethoxylated nonylphenol (9-10 moles EO)

Composition 13
  65% pre-gelatinized corn starch
  34.5% acrylamide/sodium AMPS latex copolymer (Polymer C)
  0.5% ethoxylated nonylphenol (9-10 moles EO)

Using these compositions, they were evaluated as taconite pelletizing agents. The results are set forth below:

EXAMPLE 1

TACONITE PELLETIZING RESULTS (Pilot-Scale Pelletizing Drum)

A U.S. ore from the Mesabi Range, high in magnetite content and with a size split of ~90% minus 325 mesh, was pelletized in a pilot scale 16 inch balling drum. Green strengths represent the number of 18 inch vertical drops to cause wet pellet fracture. Dry strengths represent the number of 3 inch vertical drops to cause pellet fracture of balls dried at 105° C. Dry compression strengths were measured on pellets ($\frac{1}{2}'' \times \frac{3}{8}''$) using a penetrometer unit.

TABLE I

| Additive | Dosage (lbs/ton) | Green Drop Strength | Dry Drop Strength | Dry Compression Strength(psi) |
|---|---|---|---|---|
| None | — | 2 | 2 | 0.5 |
| Bentonite | 10 | 5 | 14 | 3.5 |
| Bentonite | 15 | 5 | 37 | 4.4 |
| Bentonite | 30 | 7 | 40 | 5.4 |
| Composition 1 | 2.5 | 4 | 5 | 2.3 |
|  | 5.0 | 15 | 22 | 3.5 |
|  | 9.0 | 40 | 40 | 7.0 |
| Composition 2 | 2.5 | 4 | 6 | 2.0 |
| Composition 3 | 2.5 | 3 | 4 | 1.4 |
| Composition 4 | 2.5 | 2 | 4 | 1.8 |
| Composition 5 | 2.5 | 3 | 4 | 1.8 |
| Composition 6 | 9.0 | 4 | 40 | 7.0 |
| Composition 7 | 2.5 | 7 | 6 | 1.8 |

The above results show that a number of the compositions yield both green and dry strength values greater than untreated ore. Composition 1 actually produces markedly better results than the bentonite clay standard at a small fraction of the dosage.

EXAMPLE 2

TACONITE PELLETIZING RESULTS (Plant-Scale Pelletizing Disk)

A South American iron ore high in hematite content was pelletized in 12-meter Dravo pelletizing disks in a commercial concentrator plant. Pellets were then evaluated with respect to size ranges formed, strengths, and final pellet moisture content. Green (wet) and dry ball strengths were determined with a Dillon Compression Strength Tester.

TABLE II

| Binder | Final Pellet Moisture | Wet Compression Strength (g/pellet) | Dry Compression Strength (g/pellet) | Yield of $-\frac{5}{8}'' \times +\frac{3}{8}$ Pellets |
|---|---|---|---|---|
| None | 9.6 | Too weak to measure | Too weak to measure | 26.1 |
| 2 lbs/ton Composition 8 | 9.4 | 844 | 1,135 | 72.6 |
| 20 lbs/ton Bentonite Clay | 9.7 | 940 | 2,443 | 67.5 |

The above results show that one of the subject compositions gave excellent results at one-tenth the dosage of bentonite. While the dry strength produced by the low dosage of the composition was marginally lower than that of bentonite clay at ten times the dosage, the results are entirely acceptable.

The table below shows the favorable impact that Composition 8 usage had on final fired pellet properties relative to bentonite-bound pellets. Note that Composition 8 allowed production of iron ore pellets with SiO₂ levels 0.5% lower than those produced with bentonite, and Al₂O₃ levels 0.2% lower. These reductions in inorganic impurities are considered quite significant. Also of note are the improvements in fired pellet expansion and fired pellet strength which resulted with use of Composition 8 as the pellet binder.

TABLE III

| Binder | % SiO₂ | % Al₂O₃ | %¹ Expansion | Fired Pellet² Strength (kg/pellet) | %³ −200 Kg |
|---|---|---|---|---|---|
| 20 lbs/ton Bentonite Clay | 1.62 | 0.98 | 43.1 | 224 | 38.0 |
| 2 lbs/ton Composition 8 | 1.11 | 0.80 | 33.0 | 245 | 30.0 |

¹% Expansion = % increase in size of pellet upon firing (smaller values are desirable)

²Fired pellet strength = The compression strength of fired pellets using a high pressure test unit (larger values are generally desirable)

³−200 Kg = The number of pellets (out of 200 total in number) with fired compression strength under 200 Kg/pellet (smaller values are desirable.)

EXAMPLE 3

TACONITE PELLETIZING RESULTS

A second sample of the magnetic iron ore described in Example 1 was pelletized in a 16″ pilot-scale balling drum. Binders were added in separate batch runs per the table below.

TABLE IV

| Binder | Dosage (pounds/ton) | Green Drop Strength | Dry Drop Strength | Dry Compression Strength (psi) | & Moisture on Pellets |
|---|---|---|---|---|---|
| (none) | 0 | 2 | 1 | 0.5 | 6.7 |
| Bentonite | 5 | 3 | 2 | 1.1 | 6.7 |
| Bentonite | 10 | 3 | 3 | 2.1 | 8.9 |
| Bentonite | 15 | 6 | 7 | 2.7 | 10.0 |
| Bentonite | 20 | 7 | 24 | 3.2 | 10.4 |
| Pre-gelatinized Corn Starch | 3 | 2 | 7 | 2.7 | 8.7 |
| | 6 | 3 | 14 | 3.1 | 8.9 |
| Composition 9 | 6 | 26 | 63 | 5.1 | 10.9 |
| Composition 10 | 6 | 19 | 47 | 4.5 | 10.4 |
| Composition 11 | 6 | 3 | 49 | 4.8 | 8.9 |
| Composition 12 | 6 | 14 | 60 | 4.3 | 10.7 |
| Composition 13 | 6 | 22 | 59 | 5.7 | 13.2 |

The above results demonstrate Compositions 9-13 provide markedly better results than the bentonite standard binder at a fraction of the dosage. Moreover, the efficacy of the combination of a polysaccharide with a latex polymer is most evident: pre-gelatinized starch alone produces good dry pellet strength (6 pounds/ton) but poor green strength. However, all of the compositions produced pellets with exceptional green and dry strengths. It should be noted that Compositions 12 and 13 do not contain the borax (sodium tetraborate component), and that pellet strengths were not compromised.

Having thus described our invention, we claim:

1. A composition for agglomerating a wetted metal-containing ore which comprises:

| Ingredients | General % by Weight |
|---|---|
| A. A water-in-oil emulsion of a water-soluble vinyl addition polymer which contains at least 10% by weight of the water-soluble vinyl addition polymer | 10–45 |
| B. A polysaccharide | 55–90 |
| C. A water-soluble surfactant | .0001–10 |
| D. Borax | 0–15 |

2. The composition of claim 1 where the water-soluble vinyl addition polymer is an acrylamide polymer having a molecular weight of at least 1,000,000.

3. The composition of claim 2 where the acrylamide polymer contains from 1–40 mole percent of either acrylic acid or 2-acrylamido-2-methyl propanesulfonic acid.

4. The compostion of claim 1 wherein Ingredient "A" contains at least 20% by weight of the water-soluble vinyl addition polymer.

5. The composition of claim 1 where the polysaccharide is a gelatinized starch.

6. The composition of claim 5 where the gelatinized starch is a pre-gelatinized dried corn starch.

* * * * *